United States Patent
Coffield et al.

(10) Patent No.: US 9,976,621 B2
(45) Date of Patent: May 22, 2018

(54) PRE-DEFORMED THERMOPLASTICS SPRING AND METHOD OF MANUFACTURE

(75) Inventors: Timothy P. Coffield, Grand Rapids, MI (US); Robert K. Strating, Hudsonville, MI (US); Dean A. Zimmerman, Comstock Park, MI (US); Andrew B. Hartmann, Muskegon, MI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 684 days.

(21) Appl. No.: 13/393,969

(22) PCT Filed: Sep. 15, 2010

(86) PCT No.: PCT/US2010/048867
§ 371 (c)(1),
(2), (4) Date: Mar. 2, 2012

(87) PCT Pub. No.: WO2011/034882
PCT Pub. Date: Mar. 24, 2011

(65) Prior Publication Data
US 2012/0153536 A1 Jun. 21, 2012

Related U.S. Application Data

(63) Continuation-in-part of application No. 11/423,540, filed on Jun. 12, 2006, now Pat. No. 9,215,933, which
(Continued)

(51) Int. Cl.
*F16F 1/36* (2006.01)
*F16M 13/02* (2006.01)
(Continued)

(52) U.S. Cl.
CPC ............... *F16F 1/46* (2013.01); *F16F 1/376* (2013.01)

(58) Field of Classification Search
CPC .......... F16F 1/3732; F16F 1/377; F16F 1/371; F16F 1/422; F16F 2236/02; B29C 55/00;
(Continued)

(56) References Cited

U.S. PATENT DOCUMENTS

| 3,174,741 A | 3/1965 | Wolff |
| 3,233,885 A | 2/1966 | Propst |

(Continued)

FOREIGN PATENT DOCUMENTS

| CN | 1118644 C | 8/2003 |
| CN | 1561174 A | 1/2005 |

(Continued)

OTHER PUBLICATIONS

Summary of Remarks from Japanese Patent Office; Office Action from Japanese Patent Office dated Feb. 3, 2009.
(Continued)

*Primary Examiner* — Robert A. Siconolfi
*Assistant Examiner* — San M Aung
(74) *Attorney, Agent, or Firm* — Levenfeld Pearlstein, LLC

(57) ABSTRACT

A thermoplastic spring and a method for manufacturing the thermoplastic spring are provided to reduce the effect of creep during use of the spring. The spring is molded and deformed to final dimensions by pre-inducing creep in the molded body.

20 Claims, 7 Drawing Sheets

Related U.S. Application Data is a continuation-in-part of application No. 11/423,220, filed on Jun. 9, 2006, now abandoned, which is a continuation-in-part of application No. 11/112,345, filed on Apr. 22, 2005, now Pat. No. 7,441,758.

(60) Provisional application No. 61/242,908, filed on Sep. 16, 2009, provisional application No. 60/580,648, filed on Jun. 17, 2004.

(51) Int. Cl.
   *B29C 55/00*   (2006.01)
   *F16F 1/46*    (2006.01)
   *F16F 1/376*   (2006.01)

(58) Field of Classification Search
   CPC ... B29C 55/005; B29C 55/30; B29C 45/0055; B29C 67/00
   USPC ........ 267/35, 73, 153, 110, 141.1, 136, 292, 267/64.27; 24/20 R, 16 PB; 279/284, 279/292
   See application file for complete search history.

(56) References Cited

U.S. PATENT DOCUMENTS

| | | | |
|---|---|---|---|
| 3,663,059 A | 5/1972 | Omlie | |
| 3,663,350 A | 5/1972 | Stokes | |
| 3,799,611 A | 3/1974 | Steinfeld | |
| 4,025,676 A | 5/1977 | Koellisch | |
| 4,045,843 A * | 9/1977 | Loose | B65D 63/1018 |
| | | | 24/16 PB |
| 4,136,148 A * | 1/1979 | Joyce | B29C 45/00 |
| | | | 24/16 PB |
| 4,155,127 A | 5/1979 | Seiderman | |
| 4,235,427 A | 11/1980 | Bialobrzeski | |
| 4,399,574 A | 8/1983 | Shuman | |
| 4,647,109 A | 3/1987 | Christophersen et al. | |
| 4,698,892 A * | 10/1987 | Bakermans | F16B 2/08 |
| | | | 29/452 |
| 4,713,854 A | 12/1987 | Graebe | |
| 4,826,249 A | 5/1989 | Bradbury | |
| 4,914,178 A | 4/1990 | Kim et al. | |
| 4,980,936 A | 1/1991 | Frickland et al. | |
| 5,025,519 A | 6/1991 | Spann et al. | |
| 5,074,772 A | 12/1991 | Gutjahr | |
| 5,459,896 A | 10/1995 | Raburn et al. | |
| 5,472,154 A | 12/1995 | Qiu et al. | |
| D368,399 S | 4/1996 | Buffon | |
| 5,836,053 A * | 11/1998 | Davignon | F16L 3/233 |
| | | | 24/16 PB |
| 5,853,628 A | 12/1998 | Varona | |
| 5,876,085 A | 3/1999 | Hill | |
| 6,015,764 A | 1/2000 | McCormack et al. | |
| 6,070,763 A | 6/2000 | Gueret | |
| 6,106,752 A | 8/2000 | Chang et al. | |
| 6,113,082 A | 9/2000 | Fujino | |
| 6,360,522 B1 | 3/2002 | Walton | |
| 6,540,950 B1 | 4/2003 | Coffield | |
| D486,027 S | 2/2004 | Baxter et al. | |
| 6,726,285 B2 | 4/2004 | Caruso et al. | |
| 6,901,617 B2 | 6/2005 | Sprouse, II et al. | |
| 7,096,549 B2 | 8/2006 | Coffield | |
| 2002/0017347 A1 | 2/2002 | Nanni et al. | |
| 2002/0175165 A1 | 11/2002 | Jones | |
| 2004/0041319 A1 * | 3/2004 | Suzuki | B60R 21/04 |
| | | | 267/153 |
| 2004/0155005 A1 | 8/2004 | Murphy | |
| 2005/0116526 A1 | 6/2005 | VanDeRiet et al. | |
| 2005/0268488 A1 | 12/2005 | Hann | |
| 2006/0103222 A1 | 5/2006 | Caruso et al. | |
| 2006/0267258 A1 | 11/2006 | Coffield et al. | |
| 2006/0286359 A1 | 12/2006 | Coffield et al. | |
| 2007/0028426 A1 * | 2/2007 | Laporte | B65D 63/1063 |
| | | | 24/16 PB |
| 2007/0246873 A1 | 10/2007 | VanDeRiet et al. | |
| 2010/0025901 A1 | 2/2010 | Hofmann et al. | |

FOREIGN PATENT DOCUMENTS

| | | |
|---|---|---|
| EP | 1607028 A2 | 12/2005 |
| GB | 2088206 A | 6/1982 |
| JP | S5938942 Y | 6/1982 |
| JP | H0160246 B2 | 10/1985 |
| JP | H036740 U | 4/1986 |
| JP | 61102156 U | 6/1986 |
| JP | H02185207 A | 7/1990 |
| JP | H04200410 A | 7/1992 |
| JP | 3006470 U | 1/1995 |
| JP | 2002051878 A | 2/2002 |
| WO | 84/03545 A1 | 9/1984 |
| WO | 0115572 A1 | 3/2001 |
| WO | 03/061434 A1 | 7/2003 |
| WO | 2008/015247 A1 | 2/2008 |

OTHER PUBLICATIONS

Product Brochure: www.bedsandmore.de/components/components.html; viewed on Oct. 26, 2006.
Product Disclosure: www.accupunto.com; viewed on Oct. 26, 2006.
ISR for PCT/US2010/048867 dated Jan. 17, 2011.
Hytrel Dupont Product Guide.
Rycote Shock Mount Advertisement.

* cited by examiner

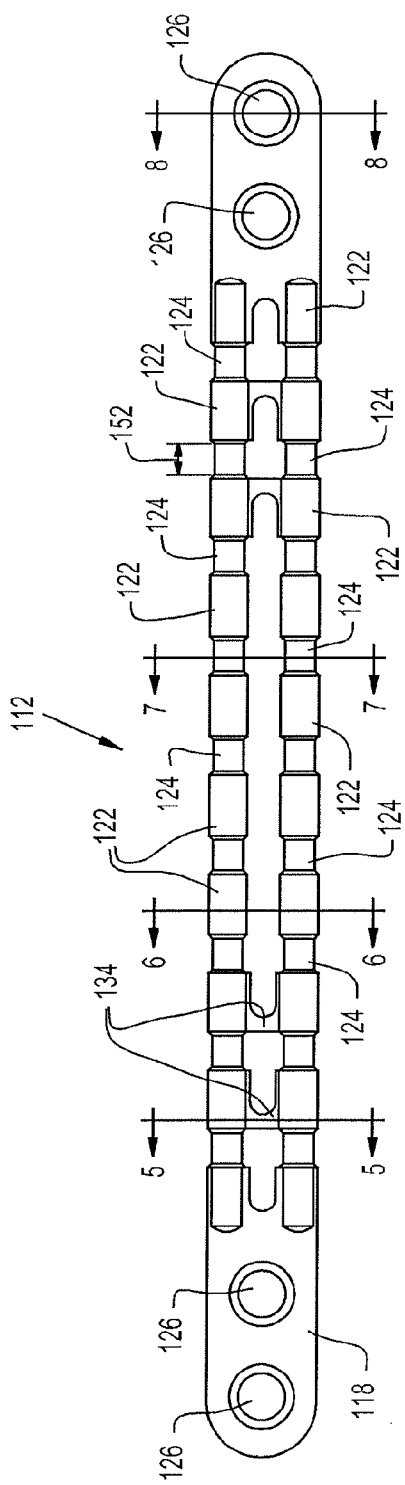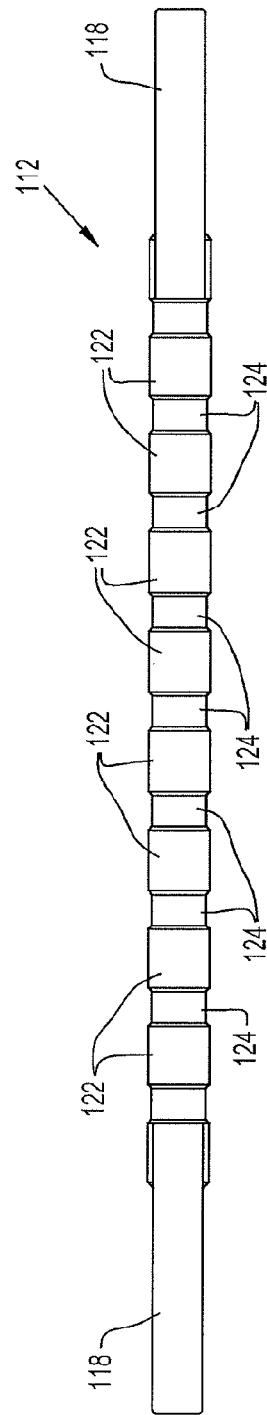
Fig. 2
Fig. 3

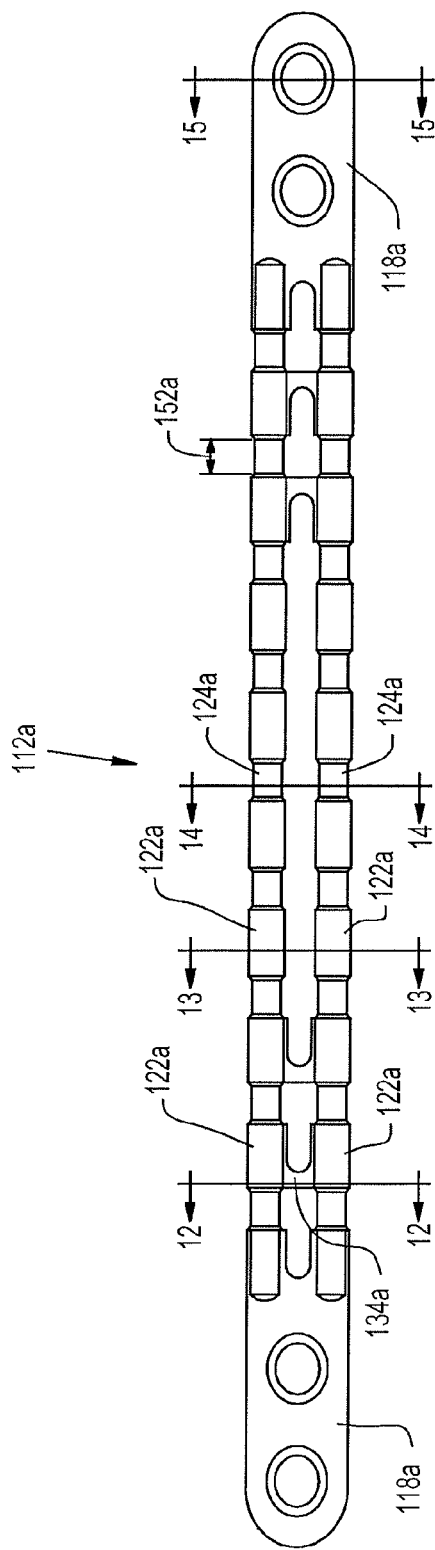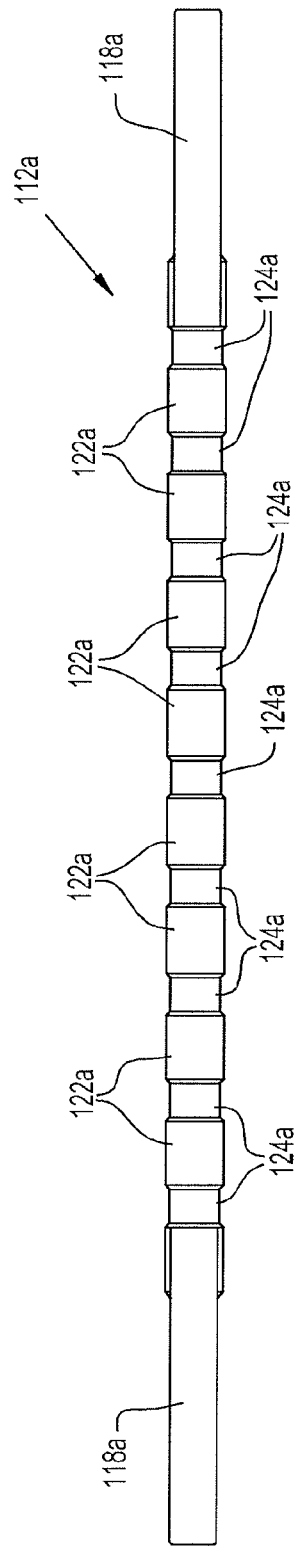

PRE-DEFORMED THERMOPLASTICS SPRING AND METHOD OF MANUFACTURE

CROSS-REFERENCE TO RELATED APPLICATIONS

The present application is National Phase of PCT/US2010/048867 filed Sep. 15, 2010 and claims the benefits of U.S. Provisional Application Ser. No. 61/242,908 filed Sep. 16, 2009; and is a continuation-in-part of U.S. patent application Ser. No. 11/423,540 filed Jun. 12, 2006; which is a continuation-in-part of U.S. patent application Ser. No. 11/423,220 filed Jun. 9, 2006, (now abandoned); which is a continuation-in-part of U.S. patent application Ser. No. 11/112,345 filed Apr. 22, 2005, now U.S. Pat. No. 7,441,758; which claims the benefits of U.S. Provisional Application Ser. No. 60/580,648 filed Jun. 17, 2004.

FIELD OF THE INVENTION

The present invention relates to thermoplastic springs, and more particularly to molded elastomeric springs, such as railroad air hose support straps, and a method for manufacturing the same,

BACKGROUND OF THE INVENTION

It is known to provide spring-loaded mechanical assemblies with a metal coil spring having fabricated end details attached to the spring fro securing the spring within a system or assembly. Such spring assemblies can experience various problems, such as, for example, rust, noise from the spring coils contacting one another or contacting neighboring parts, metal fatigue through repeated cycles that diminish consistent spring rate performance and that eventually may lead to failure, dangerous sharp and hooked ends of the spring, etc.

Elastomeric springs or straps are used in place of metal springs in many different applications. For example, thermoplastic straps are used to support railroad air hoses, including at the point of connection between an air hose of one railroad car and an air hose of the adjacent railroad car connected thereto. Each railroad car has a strap connected between the railroad car and the fitting at the end of the air hose of the railroad car. When the fittings on the air hoses of adjacent cars are connected together, the elastomeric straps support the connection and must have sufficient strength to continue holding the fitting during a car disconnect procedure. Other uses for elastomeric straps that take advantage of the spring characteristics thereof include, but are not limited to supporting hoses on tractor-trailers, cargo containment straps, office chair tilt and tension members, machine counter balances such on dishwasher doors, etc.

It is known that elastomeric straps or springs develop memory when stretched over time or when stretched beyond an inherent limit thereof. When stretched beyond a yield point, the strap will not return to the pre-stretch length it possessed, but instead will be longer. Permanent de-formation in elastic members is known as "creep". A thermoplastic strap of proper length and tension when new can become inadequate for its intended purpose when creep exceeds even a small amount.

It is well-known in the railroad industry that air hose support separations are one of the most common causes for undesired emergency braking. The costs associated with unplanned rail stoppages are significant since the train has to come to a complete stop, a train worker has to disembark the rail car and walk the length of the rail locating the failed strap, the strap has to be repaiers or replaced, then the brake line needs to be re-pressurized prior to resuming travel. Two root casues of air hose breakages are fastening clip breakage and strap breakage and/or strap elongation (yield). Due to the significant frequency of hose support failures, the Association of American Railroads ("AAR") has revised the specification application to air hose support straps (AAR S-4006-03) to help improve the performance of hose supports.

Advantages can be obtained from a new construction and method to provide a thermoplastice spring that reduces the risk of breakage and elongation during use.

SUMMARY OF THE INVENTION

The pre-deformed thermoplastic spring and method described herein provide a thermoplastic spring that can replace a traditional metal coil spring assembly with a simple molded thermoplastic part that includes features of multipart traditional spring assemblies, but in one simple molding. The pre-deformed thermoplastic spring can include integral end detail for attachment and deformed regions designed to perform elongation and recovery all in one injection molded member. Spring rate and creep resistance are programmed into the spring after molding by selective deformation to a predetermined length that will generate the appropriate creep resistance and spring tension. Nodes or unique regions within the strap can provide special performance such as attachment, integral stop members, integral cams, etc.

In an aspect of a form there of, a thermoplastic spring is provided with a thermoplastic body, at least one non-deformed region in the body having dimensions established by molding of the body; and at least one deformed region in the body, the at least one deformed region being deformed after molding to have a deformed dimension greater than the dimension thereof created by molding, with the deformed dimension resulting from elongation beyond the elongation anticipated for use of the thermoplastic spring.

In an aspect of a form there of, an air hose support strap is provided with a monolithic, elastomeric, thermoplastic body, end regions of the body having dimensions established by molding; and an intermediate region between the end regions having dimensions established by molding and subsequent stretching of the molded dimension to a larger dimension.

In an aspect of a form thereof, a method for making a thermoplastic spring is provided with steps that include forming a thermoplastic spring body to a dimension less than a final dimension of the spring; elongating at least a portion of the spring body to a dimension greater than the final dimension; and releasing the elongated portion to achieve the final dimension of the spring.

An advantage of at least one form of a pre-deformed thermoplastic spring is that manufacturing and tooling advantages are achieved in that one mold can produce a varying range of springs sizes and tensions, thereby saving cost and eliminating the need to inventory a large range of spring sizes.

Other features and advantages of the invention will become apparent to those skilled in the art upon review of the following detailed description, claims and drawings in which like numerals are used to designate like features.

BRIEF DESCRIPTION OF THE DRAWINGS

FIG. 2 is a plan view of a thermoplastic spring after molding and prior to deforming;

FIG. 3 is a plan view of the thermoplastic spring of FIG. 2, showing a side adjacent view shown in FIG. 2;

FIG. 9 is a is a plan view of the thermopolastic spring of FIG. 2, but showing the thermoplastic spring after deforming;

FIG. 10 is a top plan view of the thermoplastice spring of FIG. 9, showing a side adjacent the view shown in FIG. 9;

Figure 1:
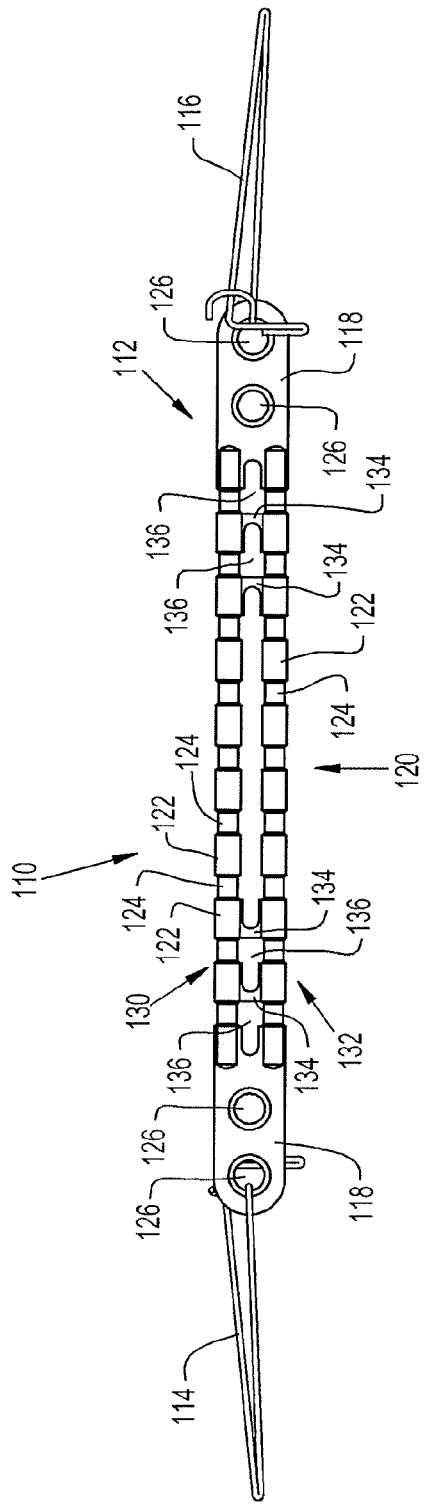
FIG. 1 is a plan view of an air hose support strap that includes a pre-deformed thermoplastic spring.
Figure 4:
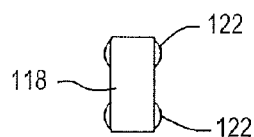
FIG. 4 is an end view of the thermoplastic spring of FIG. 2.
Figure 5:
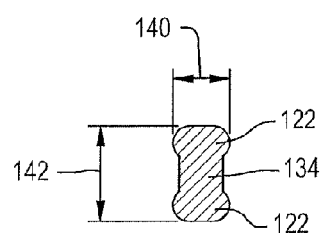
FIG. 5 is a cross-sectional view of the thermoplastic spring shown in FIG. 2, taken along line 5-5 of FIG. 2
Figure 6:
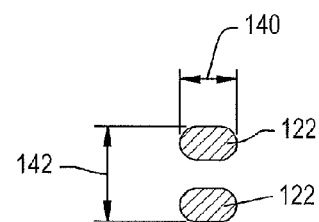
FIG. 6 is a cross-sectional view of the thermoplastic spring shown in FIG. 2, taken along line 6-6 of FIG. 2
Figure 7:
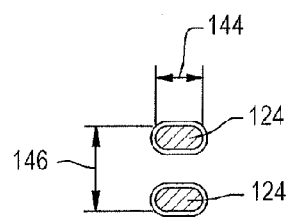
FIG. 7 is a cross-sectional view of the thermoplastic spring shown in FIG. 2, taken along line 7-7 of FIG. 2
Figure 8:
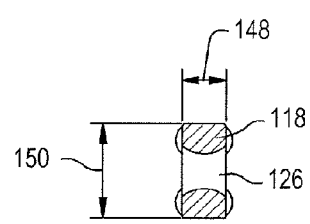
FIG. 8 is a cross-sectional view of the thermoplastic spring shown in FIG. 2, taken along line 8-8 of FIG. 2.
Figure 11:
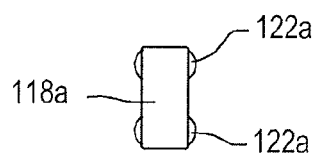
FIG. 11 is an end view of the thermoplastic spring ahown in FIG. 9.
Figure 12:
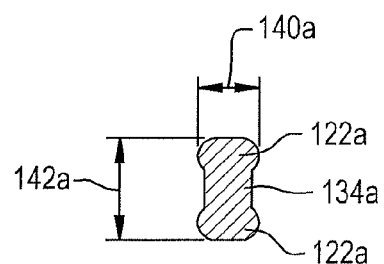
FIG. 12 is a cross-sectional view of the thermoplastic spring shown in FIG. 9, taken along line 12-12 of FIG. 9.
Figure 13:
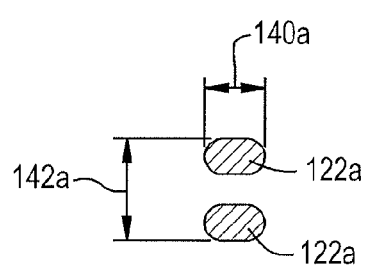
FIG. 13 is a cross-sectional view of the thermoplastic spring shown in FIG. 9, taken along line 13-13 of FIG. 9.
Figure 14:
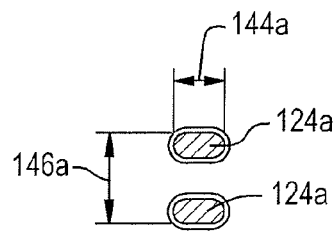
FIG. 14 is a cross-sectional view of the thermoplastic spring shown in FIG. 9, taken along line 14-14 of FIG. 9.
Figure 15:
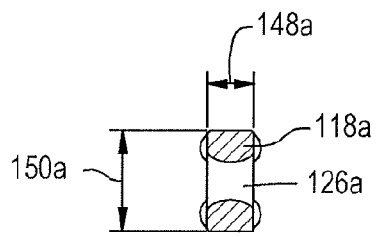
FIG. 15 is a cross-sectional view of the thermoplastic spring shown in FIG. 9, taken along line 15-15 of FIG. 9.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and particularly to FIG. 1, an air hose support strap 110 is shown. Support strap 110 generally includes a molded thermoplastic spring 112 and a pair of clips 114, 116 mounted to the thermoplastic spring 112 at opposite ends. The size, shape and configuration of thermoplastic spring 112 may vary from application to application depending, in large part, on the desired characteristics of the finished support strap 110. It should be understood that air hose support strap 110 is merely one exemplary embodiment of a structure that can employ a pre-deformed thermoplastic spring advantageously. Many other applications for pre-deformed thermoplastic springs are contemplated, such as, but not limited to supporting hoses on tractor-trailers, cargo containment straps, office chair tilt and tension members, machine counter balances such on dishwasher doors, etc.

In the illustrated exemplary embodiment, thermoplastic spring 112 generally includes a pair of end portions 118 that are joined by a central intermediate region 120 having a plurality of alternating nodes 122 and connectors 124. Some, but not all of the nodes 122 and connectors 124 are identified with reference numerals in the drawings. In the illustrated exemplary embodiment, end portions 118 are regions of an essentially uniform thickness selected so that the end portions 118 do not undergo significant deformation during the deforming process to be described subsequently. It may, however, be acceptable for end portions 118 to undergo significant deformation in some applications and uses of pre-deformed thermoplastic springs. Each end portion 118 of the illustrated embodiment defines two longitudinally spaced apertures 126 for receiving clips 114, 116. Apertures 126 may be surrounded by an integral boss (not shown) to, among other things, reduce the likelihood of damage to the support strap at the clip interface. The number and spacing of apertures 126 may vary from application to application, as desired. If desired, the apertures 126 may be replaced or supplemented by other clip mounting features, such as contours in the shape of the end portions 118 that facilitate attachment of clips 114, 116. The size, shape and configuration of the end portions 118 and any clip mounting features incorporated into the end portions 118 may vary from application to application.

As noted above, central region 120 of thermoplastic spring 112 includes alternating nodes 122 and connectors 124. Nodes 122 are regions of generally greater cross sectional areas than the cross sectional areas of connectors 124. As a result, nodes 122 present greater resistance to deformation during manufacture, and greater resistance to elongation when placed under a load during use. The cross sectional areas of nodes 122 and connectors 124 may vary from application to application, depending in part on the desired characteristics of the finished strap 110. The shape variations resulting from alternating nodes 122 and connectors 124 provides the additional benefit of allowing for easier handling of the strap 110, for example, while wearing gloves. In some applications, it may be desirable to vary the shapes of these components to facilitate handling by end users.

In one embodiment, nodes 122 and connectors 124 are configured to define two substantially parallel strands 130, 132; each strand 130, 132 including a series of alternating nodes 122 and connectors 124, and each strand 130, 132 extending from one end portion 118 to the other end portion 118. The nodes 122 on parallel strands 130, 132 may be joined in select locations. In the illustrated exemplary embodiment, the first three sets of nodes 122 at each end of the central region 120 are joined together by integrally formed bridges 134 that extend between strands 130 and 132. Bridges 134 may cooperate with nodes 122 and connectors 124 to define a space 136 suitable for receiving a clip 114, 116, thereby permitting attachment of the clips 114, 116 in the end portions 118 or through more inward portions of thermoplastic spring 112. The number and characteristics of the bridges 134 may be selected as one factor in providing the finished strap 110 with desired characteristics. For example, additional bridges 134 may be included to stiffen the strap 110 against lateral deflection or to provide additional clip mounting features.

In one embodiment, adjacent nodes 122 are joined by a single connector 124. The number of connectors 124 joining the nodes 122 may vary from application to application, and from location to location within a single strap. In the illustrated embodiment, nodes 122 and connectors 124 are generally aligned in a longitudinal direction, but they need not be aligned in all embodiments.

In one embodiment, clips 114, 116 are mountable to the strap at different locations to, among other things, allow adjustment of the effective length of the support strap. In one embodiment, the molded body defines a plurality of clip mounting features to facilitate mounting of the clips. The mounting features may be essentially any structure suitable for mounting the mounting clips to the molded body. For example, the mounting features may be apertures through the molded body and/or contours in the shape of the molded body. In the illustrated embodiment, the mounting features include two apertures through each end of the molded body as well as a plurality of openings through the central region 120 of the molded body. In alternative embodiments, the support strap may include a different number of mounting features. For example, the support strap may include only a single mounting feature on one of the end portions 118, thereby facilitating length adjustment through movement of only one clip. As another example, the support strap may include only a single mounting feature on each end portion 118 when length adjustability is not desired.

In the illustrated embodiment, thermoplastic spring 112 includes a plurality of substantially equal-sized, regularly spaced nodes 122 and substantially equal-sized, regularly spaced connectors 124. Nodes 122 and connectors 124, however, need not be of equal size nor have regular spacing along the strands 130, 132. To the contrary, nodes 122 and connectors 124 may vary in size, shape, spacing or other characteristics from application to application to allow the "in use" characteristics of the strap 110 to be tuned. In some applications, the characteristics of nodes 122 and connectors 124 may vary in different regions of thermoplastic spring 112 to provide localized control over the characteristics of thermoplastic spring 112 in the different regions. For example, select regions of strap 110 may be stiffened by adjusting the characteristics of nodes 122 and/or connectors 124 in that region. Although the nodes 122 and connectors 124 of this embodiment have a substantially oblong-circular cross section, they may vary in cross-section from application to application. For example, nodes 122 and connectors 124 with circular, square, triangular, rectangular or irregular shaped cross-sections may be desired in certain applications. It should also be noted that the nodes 122 and connectors 124 of the illustrated embodiment share substantially similar cross sectional shapes that vary primarily only in scale. Nodes 122 and connectors 124 need not be similar in cross sectional shape, but may vary as desired. Although the illustrated embodiment includes the same number of nodes 122 and connectors 124 in each strand 130, 132, the numbers may vary from application to application, if desired.

FIGS. 2-8 further illustrate the geometry of the exemplary thermoplastic spring 112 in one embodiment of the present invention. The drawings show the shapes and relative areas along various cross sections. As can be appreciated, the moment of inertia for this embodiment is consistently stiffer in one direction, thereby leading the strap to bend primarily in one direction during use. In an exemplary embodiment, a node width 140 (FIGS. 5 and 6) was molded at 0.63 inch and a node to node height 142 was provided at 1.07 inch. A connector width 144 (FIG. 7) of 0.54 inch and a connector to connector height 146 of 0.99 (FIG. 7) was provided. End portion 118 had an end portion width 148 (FIG. 8) of 0.50 inch and an end portion height 150 of 1.07 inch. A support strap manufactured in accordance with these dimensions and properly deformed has proven to satisfy AAR S-4006-03.

FIG. 9-15 shows the geometry of deformed thermoplastic spring 112a after it has been deformed in accordance with one suitable deforming process (as described in more detail below). The molded thermoplastic spring 112 may be deformed with other acceptable deforming processes that result in a deformed thermoplastic spring 112a with different geometry and moment of inertia properties. In FIGS. 9-16 deformed components of thermoplastic spring 112 arc designated with the suffix "a" but the same reference number. Accordingly, deformed thermoplastic spring 112a includes nodes 122a and connectors 124a in strands 130a and 132a. As can be seen in FIGS. 10-16, end portions 118a of the deformed thermoplastic spring 112a remain substantially unchanged after deforming. The connectors 124a have, however, undergone a material change in length and cross-sectional area. The length 152 (FIG. 2) of connectors 124 is approximately 0.252" prior to deforming and approximately 0.395" following deforming (connector length 152a shown in FIG. 9). During deforming, the connector length reaches a maximum of 0.97" at maximum deforming distance.

In the exemplary embodiment, after deforming, a post deforming node width 140a (FIGS. 12 and 13) remains at 0.63 inch, and a post deforming node to node height 142a remains at 1.07 inch. The post deforming connector width 144a (FIG. 14) is 0.43 inch and the connector to connector height 146a is 0.91. End portion 118a has an end portion width 148a (FIG. 15) of 0.50 inch and an end portion height 150a of 1.07 inch.

In the illustrated embodiment, the support strap 110 is manufactured in a process involving molding the thermoplastic spring 112 as a monolithic body with integral attachment points for clips, including integral nodes 122 and connectors 124 for deforming. The process further includes mounting the molded part on a fixture that mates to the end portions 118 and elongating the strap by stretching with a load well beyond any load the strap is anticipated to experience in use, thereby effectively stretching the strap well beyond its yield point and consequently creating a new higher yield point. After deformation, as long as the deformed strap does not experience a load approaching the new higher yield point, it will not creep. In one embodiment, the thermoplastic spring 112 is elongated to at least twice its original length. In other embodiments, the thermoplastic spring 112 may be elongated to at least ½ to five times its original length.

In the illustrated embodiment, the molded thermoplastic spring 112 is formed using conventional injection molding techniques and apparatus. For example, the thermoplastic spring 112 may be injection molded using a conventional injection molding apparatus (not shown) having a die that is configured to provide a part with the desired shape and features. In this embodiment, the thermoplastic spring 112 is manufactured by injecting the desired material into a die cavity. The die is designed to provide a molded part (FIGS.

2-8) that will take on the desired shape (FIGS. 9-15) once any desired deformation has taken place. In other words, the die is configured to form a part that will have the desired shape and dimensions after the deformation step is complete. Although injection molding is expressly described, the thermoplastic spring 112 may be formed using other molding techniques and apparatus.

The tension of the part is programmed during the formation process by controlling the ratio of molded size to deformed size. For example, a part that is molded at 10 inches long and then deformed to 10.1 inches in length will have a different spring rate than a part that is molded at 10 inches long and deformed to 15 inches. In this example, the spring rate difference will be more than 50%. The spring is deformed by stressing beyond the load it will experience in use, to ensure that the spring does not elongated any further in use, since it has been pre-deformed beyond that level before use.

The molded thermoplastic spring 112 may be manufactured from a variety of elastomeric materials depending on the requirements of the specific application. More specifically, the thermoplastic spring 112 may be manufactured from a TPE (Thermoplastic Elastomer) material, such as a COPE (Copolyester) material or a TPU (Thermoplastic Urethane) material. In the illustrated embodiment, the thermoplastic spring 112 is molded from a thermoplastic polyether ester elastomer block copolymer. Suitable materials of this type include those available from DuPont under the Hytrel® trademark, and available from DSM under the Arnitel® trademark. In the illustrated embodiment, the material may have a Durometer in the range of 25-65 on the Shore D scale. In the illustrated embodiment, the molded body is molded from DSM EM400 or similar materials in the TPE family, especially COPEs and urethanes.

After molding, the thermoplastic spring 112 may be stretched or otherwise deformed. In one embodiment, the molded thermoplastic spring 112 is deformed in the longitudinal direction to provide creep resistance and elasticity in the direction of deformation. The thermoplastic spring 112 is deformed by increasing the alignment of the crystalline structure of the elastomeric material on a molecular level so that the support and other load bearing characteristics are altered. More particularly, a molded, un-deformed elastomeric thermoplastic spring 112 typically includes a plurality of spherulites, which are created during the growth of the polymer by the formation of crystalline lamellae in helical strands radiating from a nucleation point. In a deformed thermoplastic spring 112a, at least some of the spherulites are destroyed and the crystalline lamellae are aligned in one direction. Typically, the thermoplastic spring 112a will be deformed to such a degree that the deformed thermoplastic spring 112a has materially different load bearing characteristics in the deformed direction.

One method for deforming the thermoplastic spring 112 is through stretching. If deformation is achieved through stretching, the precise amount of stretch to be applied to a given part will depend on the configuration of the part and the desired support characteristics. In many applications, it will be desirable to stretch the thermoplastic spring 112 to at least twice, and possibly three times, its original length to achieve the desired alignment. The thermoplastic spring 112 may be stretched using conventional techniques and apparatus. In one embodiment, a set of clamps may be configured to clamp onto the end portions 118 of the thermoplastic spring 112 during stretching. As another example, the end portions 118 may be secured to a fixture by clips or bolts passing through a mounting feature, such as the outwardmost apertures 126 in the end portions 118. Because the thermoplastic spring 112 is stretched beyond its elastic limit, it recovers to an intermediate dimension that is greater than its original length as molded, with the precise amount of elongation being dependent in large part on the geometry and material characteristics of the thermoplastic spring 112 material. This deformation is a non-recoverable, permanent deformation. As a result of this non-recoverable deformation, a degree of permanent deformation is removed from the deformed thermoplastic spring 112a such that when subsequent stresses on the deformed thermoplastic spring 112a *within* the desired normal operating load are applied (for example in the range of approximately 300 to 400 lbs load), the thermoplastic spring 112a resists permanent deformation over time (i.e. creep).

In one embodiment, a cyclic deformation may be performed, wherein the membrane is deformed by stretching to a first distance, then relaxed to a second, intermediate distance, and then stretched to a second distance that could be lesser than, equal to or greater than the first distance. The sequence may be repeated as many times as necessary to achieve the desired deformation. The amount of time between cycles may vary. For example, in one embodiment, the membrane is stretched to 2 times its original length, relaxed to the original length (or until slack is present), then stretched to 1¾ times the original length.

Although the elastomeric thermoplastic spring 112 may be deformed by stretching, it may be possible in some applications to deform the thermoplastic spring 112 using other processes. As an alternative to stretching, the thermoplastic spring 112 may be deformed by compression. For example, it may be possible to deform certain materials by hammering, pressing or other forms of compression. In one embodiment for deforming by compression, the thermoplastic spring 112 is placed in a die or other structure (not shown) that constrains the thermoplastic spring 112 on all sides other than at least one side that corresponds with the desired direction of deformation. Opposed sides may be unconstrained to permit the material of the thermoplastic spring 112 to flow from both sides along the direction of deformation. Alternatively, only a single side may be unconstrained, thereby limiting material flow to a single side. A compressive force is then applied to the part. For example, a press can be used to compress the thermoplastic spring 112 within the die. Sufficient compressive force is applied so that the material begins to flow in the unconstrained direction. This in effect causes the thermoplastic spring 112 to extend, and its crystalline structure to become increasingly aligned in the direction of deformation. The amount of force applied to the thermoplastic spring 112 may vary from application to application, depending on the desired degree of alignment or deformation.

Although described in connection with deformation of the entire elastomeric thermoplastic spring 112, in some applications it is not necessary to deform the entire thermoplastic spring 112. Rather, in some applications, it may be desirable to deform only select portions or regions of the membrane. For example, in some applications it may be desirable to deform only select peripheral portions of the membrane. When desirable, this may be achieved by applying localized stretching or localized compression of the thermoplastic spring 112.

Various parameters of the deforming process may be varied to provide a deformed thermoplastic spring 112a with the desired characteristics. For example, the amount of elongation, the speed at which the elongation is applied (which may be constant or variable), the dwell time (i.e. the amount of time the thermoplastic spring 112 is held in an elongated condition), the method used to attach the thermoplastic spring 112 to the deforming fixture, and the number of cycles (e.g. the number of times the thermoplastic spring 112 is elongated) can be varied to affect the characteristics of the finished support strap. A slow, controlled stretch aids in maintaining a uniform deformation across the connectors 124 of the thermoplastic spring 112. A cyclic deformation process helps compensate for any irregularities within the thermoplastic spring 112 material to provide a uniform stretch because areas of greater or lesser stretch may even out after multiple cycles. The time between molding and deforming may also be adjusted. For example, in one embodiment, the molded thermoplastic spring 112 is stretched within a short time, such as 10-15 minutes, after it is removed from the mold, so that the thermoplastic spring 112 is still warm when it is stretched. This reduces the force that is necessary to stretch and therefore deform the thermoplastic spring 112.

Once the thermoplastic spring 112a is molded and deformed, pre-manufactured clips 114, 116 are added to opposite ends of the support strap 110. The clips 114, 116 may be attached to any mounting feature as desired. For example, a clip 114 may be attached through the aperture 126 at one end of the thermoplastic spring 112 and a coupler clip 116 may be attached through the aperture 126 at the opposite end of the thermoplastic spring 112. The design of the clips may vary from application to application.

Due to the significant frequency of hose support failures, the AAR has revised Specification S-4006-03 to help improve air hose support straps. The deforming process for the present invention is helpful in allowing the illustrated elastomeric support strap to pass the revised test. When tested, an un-deformed part of the same geometry typically failed. A part of the same geometry that was properly deformed passed the test.

Non-deformed and deformed samples were tested in accordance with the testing requirements of AAR S-4006-03. Data was generated with a load of 360 lbs., applying 10 cycles and a test duration of 20 minutes. An as-molded strap had an initial length of 23.125 inches and a final length of 24.937 inches. Accordingly, the resulting creep length was 1.812 inches, which failed the requirement of being less than 0.5 inch as outlined in AAR S-4006-03. A deformed strap had an initial length of 25.81 inches and a final length of 26.19 inches. Accordingly, the resulting creep was 0.38 inch, which passed the requirement of being less than 0.5 inch as outlined in AAR S-4006-03.

Pre-deformed thermoplastic springs can be provided in many different shapes and configurations for many different uses. FIGS. 16-24 illustrate just as some of the variations possible.

Figure 16:
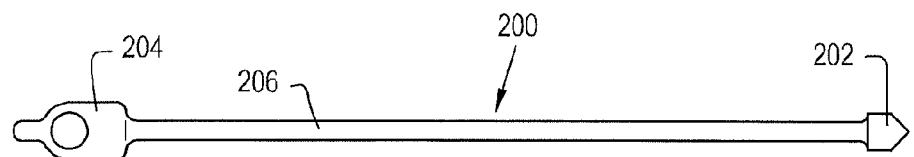
FIG. 16 is a plan view of another pre-deformed thermoplastic spring.
Figure 19:
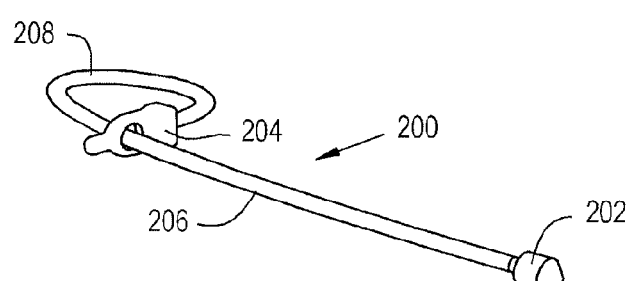
FIG. 19 is a perspective view of the pre-deformed thermoplastic spring shown in FIG. 16, but illustrating the spring in a manner of use.

FIG. 16 illustrates a thermoplastic spring 200 having an integral male attachment detail 202 and an integral female attachment detail 204. An intermediate region 206 between male attachment detail 202 and female attachment detail 204 is deformed while the attachment details at the ends thereof are not. This simple pull-through type connector can have many uses. FIG. 19 depicts strap 200 in a condition with male attachment detail 202 pulled through female attachment detail 204 to form a loop 208.

Figure 17:
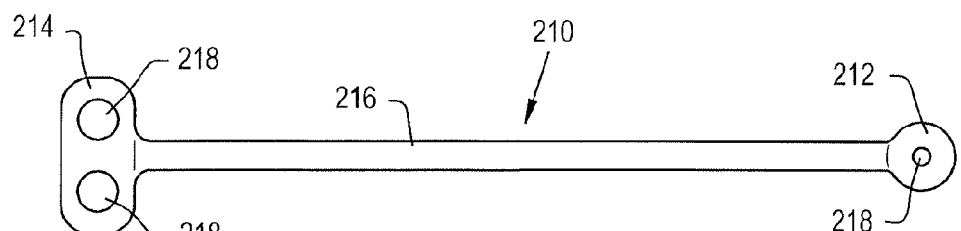
FIG. 17 is a plan view of still another pre-deformed thermoplastic spring.

FIG. 17 illustrates yet another thermoplastic spring 210 having nonsymmetrical attachment details 212, 214 at opposite ends of an intermediate region 216. Nonsymmetrical ends 212, 214 can have various shapes and configurations for securing spring 210 in an assembly. For example, attachment details 212, 214 can be provided with holes 218 to receive fasteners in an assembly. In the exemplary embodiment shown, attachment detail 212 is provided with one fastening hole 218, and attachment detail 214 is provided with two attachment holes 218. However, it should be understood that more or fewer attachment holes can be provided, and attachment details 212, 214 can have various other shapes or sizes for attachment by other than fasteners inserted through holes.

Figure 18:
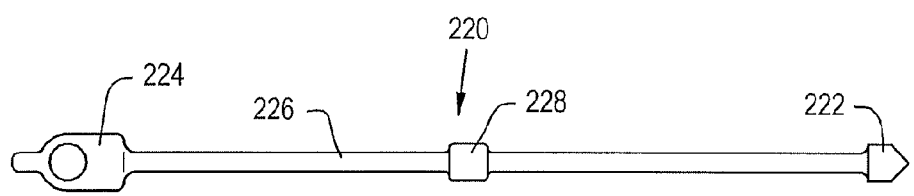
FIG. 18 is a plan view of a modified form of the pre-deformed thermoplastic spring shown in FIG. 16.

FIG. 18 illustrates a variation of thermoplastic spring 200. Thermoplastic spring 220 illustrated in FIG. 18 includes a male attachment detail 222 and a female attachment detail 224 similar to male attachment detail 202 and female attachment detail 204 described previously. An intermediate region 226 between male attachment detail 222 and female attachment detail 224 further includes an intermediate node 228. A node is a section of the strap that has a larger cross-section than the deformed regions adjacent to it. The node is provided for intended purposes of performing special operations. Node 228 can provide numerous functions such as, for example, a cam, a stop, a connecting location, a limiter against movement or other features. Accordingly, node 228 can be provided in various shapes and configurations, with detailed features to perform the desired function.

Figure 20:
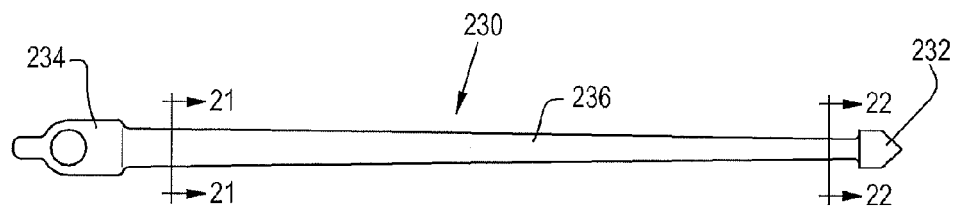
FIG. 20 is a plan view of yet another embodiment of a pre-deformed thermoplastic spring.
Figure 21:
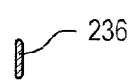
FIG. 21 is a cross-sectional view of the pre-deformed thermoplastic spring shown in FIG. 20, taken on line 21-21 of FIG. 20.
Figure 22:
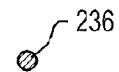
FIG. 22 is a cross-sectional view of the pre-deformed thermoplastic spring shown in FIG. 20, taken on line 22-22 of FIG. 20.

The deformed portion of a thermoplastic spring can include varying cross-sectional shapes; however, the cross-sectional area between non-deformed areas of the spring should be constant. That is, between two non-deformed ends, or between a non-deformed end and a node, or between two nodes, the cross-sectional shape of the deformed length can change but the cross-sectional area should remain constant. FIG. 20 illustrates a thermoplastic spring 230 having a male attachment detail 232 at one end and a female attachment detail 234 at the opposite ends of an intermediate region 236. Near male attachment detail 232 intermediate region 236 is substantially circular in cross-section, as illustrated in FIG. 22. Near female attachment detail 234 intermediate region 236 is substantially rectangular in cross-section, as illustrated in FIG. 21. However, the cross-sectional areas depicted in FIGS. 21 & 22 are substantially equal. The cross-sectional shape of intermediate region 236 transitions gradually and consistently from one end to the other, at all points maintaining the same cross-sectional area.

Figure 23:
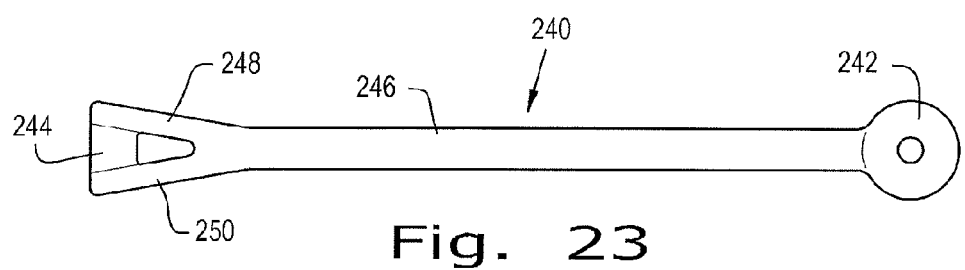
FIG. 23 is a plan view of still another embodiment of a pre-deformed thermoplastic spring.

FIG. 23 illustrates yet a further variation. A deformed thermoplastic spring 240 includes a first connecting feature 242 and a second connecting feature 244. An intermediate region 246 is provided there between. The constant cross-sectional area of intermediate region 246 is divided into multiple individual cross-sections of end segments 248, 250, the cross-sectional areas of which are equal to the cross-sectional area of intermediate region 246.

Figure 24:
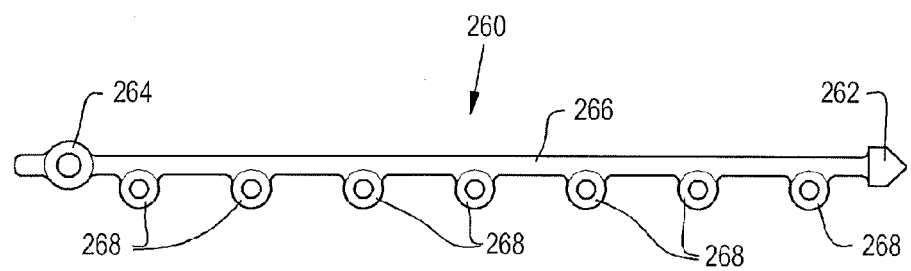
FIG. 24 is a plan view of a still further embodiment of a pre-deformed thermoplastic spring.

FIG. 24 illustrates multiple individual features combined in a single thermoplastic spring 260. A male attachment detail 262 is provided at one end and a female attachment detail 264 is provided at an opposite end of an intermediate region 266. Intermediate region 266 includes a plurality of nodes 268, seven such nodes 268 shown in the exemplary embodiment. Intermediate subregions are provided between each of the attachment details 262, 264 and the first nodes 268 adjacent thereto, and between adjacent nodes 268. The intermediate subregions can be deformed differently to have different post-deformation characteristics by performing the deformation by stretching differently in any of the deformation step conditions discussed previously. Accordingly, spring 260 can have different performance characteristic at different locations along the length of intermediate region 266.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A thermoplastic spring, comprising:
   a thermoplastic body;
   at least one non-deformed region in said body having dimensions established by molding of the body; and
   at least one deformed region in said body, the deformed region extending fully across a cross-section of the body, the deformed region being deformed by stretching and having a first deformed dimension, in a stretched state, greater than the dimension thereof created by molding, the deformed region having a second deformed dimension in a non-stretched state greater than the dimension thereof created by molding and less than the dimension thereof in the stretched state;
   said deformed dimension resulting from elongation beyond a final in-use dimension of the thermoplastic spring.

2. The thermoplastic spring of claim 1, including a plurality of non-deformed regions.

3. The thermoplastic spring of claim 1, including a plurality of deformed regions.

4. The thermoplastic spring of claim 1, including a plurality of non-deformed regions and a plurality of deformed regions.

5. The thermoplastic spring of claim 1, having at least one non-deformed node among multiple deformed regions.

6. The thermoplastic spring of claim 5, including a series of alternating non-deformed nodes and deformed regions.

7. The thermoplastic spring of claim 1, said deformed region including at least two strands.

8. The thermoplastic spring of claim 7, said strands each having non-deformed nodes within the deformed regions thereof.

9. The thermoplastic spring of claim 8, including bridges connecting at least some nodes from one strand to at least some nodes of the other strand.

10. An air hose support strap, comprising:
    a monolithic, elastomeric, thermoplastic body;
    end regions of said body having dimensions established by molding; and
    an intermediate region between said end regions having a molded dimension and having final dimensions in a non-stretched state established by molding and subsequent stretching of the molded dimension to a larger dimension, at least a portion of said intermediate region extending fully across a cross-section of said body, the final dimensions being greater than the molded dimension and less than the stretched dimension.

11. The air hose support strap of claim 10, said intermediate region having at least one non-deformed node therein thicker than deformed sections in said intermediate region.

12. The air hose support strap of claim 10, said intermediate region including at least two strands.

13. The air hose support strap of claim 12, said strands having alternating non-deformed nodes and deformed segments.

14. The air hose support strap of claim 13, including bridges connecting at least some nodes from one strand to at least some nodes of the other strand.

15. A method for making a thermoplastic spring, comprising:
    forming a spring body of thermoplastic material to a dimension less than a final dimension of the spring;
    elongating at least a portion of the spring body to a dimension greater than the final dimension, wherein the elongation occurs, at least in part, fully across a cross-section of the spring body; and
    releasing the elongated portion to a non-stretched state.

16. The method of claim 15, said elongating performed by stretching.

17. The method of claim 15, said elongating performed by stretching a first distance and releasing, followed by stretching a second distance.

18. The method of claim 17, said first and second distances being different.

19. The method of claim 15, said elongating including stretching and holding the at least a portion of the spring body in the stretched condition.

20. The method of claim 15, said elongating including stretching at least a first time and a second time at different conditions of at least one of acceleration, distance and dwell time.

* * * * *

UNITED STATES PATENT AND TRADEMARK OFFICE
CERTIFICATE OF CORRECTION

Page 1 of 1

PATENT NO. : 9,976,621 B2
APPLICATION NO. : 13/393969
DATED : May 22, 2018
INVENTOR(S) : Timothy P. Coffield et al.

It is certified that error appears in the above-identified patent and that said Letters Patent is hereby corrected as shown below:

In the Drawings

In FIG. 2, Line 1, delete "''26'' and insert -- 126 --, therefor.

In the Specification

Column 1, Line 24, delete "same," and insert -- same. --, therefor.
Column 1, Line 30, delete "fro" and insert -- for --, therefor.
Column 2, Line 1, delete "repaiers" and insert -- repaired --, therefor.
Column 2, Line 3, delete "casues" and insert -- causes --, therefor.
Column 2, Line 11, delete "thermoplastice" and insert -- thermoplastic --, therefor.
Column 3, Line 8, after "of FIG. 2" insert -- ; --.
Column 3, Line 10, after "of FIG. 2" insert -- ; --.
Column 3, Line 12, after "of FIG. 2" insert -- ; --.
Column 3, Line 14, delete "thermopolastic" and insert -- thermoplastic --, therefor.
Column 3, Line 17, delete "thermoplastice" and insert -- thermoplastic --, therefor.
Column 3, Line 19, delete "ahown" and insert -- shown --, therefor.
Column 9, Line 33, delete "elastomcric" and insert -- elastomeric --, therefor.

Signed and Sealed this
Twenty-ninth Day of January, 2019

Andrei Iancu
*Director of the United States Patent and Trademark Office*